(12) United States Patent
Fujiwara et al.

(10) Patent No.: US 10,669,173 B2
(45) Date of Patent: Jun. 2, 2020

(54) BALLAST WATER TREATMENT DEVICE AND BALLAST WATER TREATMENT METHOD

(71) Applicant: JFE Engineering Corporation, Chiyoda-ku, Tokyo (JP)

(72) Inventors: Shigeki Fujiwara, Chiyoda-ku (JP); Masanori Nagafuji, Chiyoda-ku (JP); Yukihiko Okamoto, Chiyoda-ku (JP); Yusuke Shimono, Chiyoda-ku (JP)

(73) Assignee: JFE Engineering Corporation, Tokyo (JP)

( * ) Notice: Subject to any disclaimer, the term of this patent is extended or adjusted under 35 U.S.C. 154(b) by 0 days.

(21) Appl. No.: 16/171,260

(22) Filed: Oct. 25, 2018

(65) Prior Publication Data

US 2019/0202721 A1    Jul. 4, 2019

Related U.S. Application Data

(63) Continuation of application No. PCT/JP2016/063098, filed on Apr. 26, 2016.

(51) Int. Cl.
*C02F 1/68* (2006.01)
*B63B 13/00* (2006.01)
(Continued)

(52) U.S. Cl.
CPC .............. *C02F 1/685* (2013.01); *B63B 13/00* (2013.01); *B63J 4/002* (2013.01); *C02F 1/004* (2013.01);
(Continued)

(58) Field of Classification Search
None
See application file for complete search history.

(56) References Cited

U.S. PATENT DOCUMENTS 7,531,095 B2 * 5/2009 Williamson ............ A61L 9/205
210/739

FOREIGN PATENT DOCUMENTS

| JP | 2005-131583 A | 5/2005 |
| JP | 2007-144391 | 6/2007 |

(Continued)

OTHER PUBLICATIONS

International Search Report dated Aug. 2, 2016 in connection with PCT International Application No. PCT/JP2016/063098.
(Continued)

*Primary Examiner* — Richard C Gurtowski
(74) *Attorney, Agent, or Firm* — John P. White; Cooper & Dunham LLP

(57) ABSTRACT

A ballast water treatment device includes an oxidant supply amount control device in which a storage unit stores a relationship between an absorbance of a raw water for a ballast and a dissolved organic carbon concentration thereof and another relationship between the dissolved concentration and a residual oxidant concentration required after a predetermined time from an oxidant supply, to kill organisms and to suppress their regrowth in the ballast. A calculation unit derives the required residual oxidant concentration corresponding to the absorbance measured by a meter by referring to the relationships and calculates a target oxidant supply amount using the required residual oxidant concentration. For the target, a control unit controls an oxidant supply device.

8 Claims, 3 Drawing Sheets

(51) Int. Cl.
*C02F 1/50* (2006.01)
*B63J 4/00* (2006.01)
*C02F 1/00* (2006.01)
*C02F 1/76* (2006.01)
*C02F 101/30* (2006.01)
*C02F 103/00* (2006.01)

(52) U.S. Cl.
CPC ............... *C02F 1/008* (2013.01); *C02F 1/50* (2013.01); *C02F 1/76* (2013.01); *C02F 2101/30* (2013.01); *C02F 2103/008* (2013.01); *C02F 2201/001* (2013.01); *C02F 2209/001* (2013.01); *C02F 2209/006* (2013.01); *C02F 2209/21* (2013.01); *C02F 2209/29* (2013.01); *C02F 2209/40* (2013.01); *C02F 2303/04* (2013.01)

(56) References Cited

FOREIGN PATENT DOCUMENTS

| | | |
|---|---|---|
| JP | 2009-285523 A | 12/2009 |
| JP | 2012-254415 A | 10/2012 |
| JP | 2013-43107 A | 3/2013 |
| JP | 2013-92526 A | 5/2013 |
| JP | 2014-140815 A | 8/2014 |

OTHER PUBLICATIONS

JFE Engineering Co., Ltd., Ballast Water Management System for Ships, search on Apr. 13, 2016.
English Translation of the International Preliminary Report on Patentability, dated Oct. 30, 2018 in connection with PCT International Application No. PCT/JP2016/063098.

\* cited by examiner

BALLAST WATER TREATMENT DEVICE AND BALLAST WATER TREATMENT METHOD

CROSS-REFERENCE TO RELATED APPLICATION

This application is a Continuation Application of PCT Application No. PCT/JP2016/063098, filed Apr. 26, 2016, the entire contents of which are incorporated herein by reference.

FIELD OF THE INVENTION

The present invention relates generally to a ballast water treatment device and a ballast water treatment method for ballast water loaded in a ballast tank of a vessel.

BACKGROUND OF THE INVENTION

Generally, with regard to vessels in ballast or with little loads, water in the port (seawater, lake water, or river water) is taken in the vessels as ballast water before leaving the port, because it is necessary to secure a propeller submergence depth and safe navigation in ballast, etc. Conversely, when cargo is loaded in a vessel loaded with ballast water in the ballast tank in the port, the ballast water is discharged from the ballast tank. In the meantime, if ballast water is taken in and discharged from a vessel reciprocating between a loading port and an unloading port of different environments, the living organisms contained in the water of one port are discharged from the vessel at the other port along with the discharged ballast water. Therefore, there is concern that the coastal ecosystem of the other port may be adversely affected by the discharge. Under the circumstances, at the International Conference on Ballast Water Management of Ships, the International Convention for the Control and Management of Ship's Ballast Water and Sediments was adopted in February 2004, and it became obligatory to treat living organisms in ballast water according to the International Convention.

The standard defined by the International Maritime Organization (IMO) for the treatment of living organisms in ballast water (IMO ballast water treatment standard) stipulates that the number of living organisms (mainly, zooplankton) of 50 μm or more in size contained in ballast water discharged from a vessel is less than ten in 1 m³, the number of living organisms (mainly, phytoplankton) of 10 μm or more and 50 μm or less in size is less than ten in 1 ml, the number of *vibrio cholerae* is less than 1 cfu in 100 ml, the number of *E. coli* is less than 250 cfu in 100 ml, and the number of enterococci is less than 100 cfu in 100 ml.

Japanese Patent Application KOKAI Publication No. 2007-144391 (Patent Literature 1) and JFE Engineering Co., Ltd., Ballast Water Management System for Ships, [online], [Search on Apr. 13, 2016], Internet <URL: http://www.jfe-eng.co.jp/products/comfortable/marine/mar01.html> (Non-Patent Literature 1) each discloses a ballast water treatment device including a filtering device for filtering seawater as raw water for ballast water and capturing aquatic organisms in the seawater, and a disinfectant supply device for supplying an oxidant as a disinfectant into the filtered seawater to kill bacteria in the seawater.

In the ballast water treatment device disclosed in each of Patent Literature 1 and Non-Patent Literature 1, sodium hypochlorite or the like is used as a disinfectant, and the supply amount of the disinfectant is adjusted so that the concentration (chlorine concentration) of the disinfectant in the seawater injected into the ballast tank is kept at a predetermined appropriate concentration (constant value).

For example, in the ballast water treatment device of Non-Patent Literature 1, the supply amount of the disinfectant is usually adjusted as follows. First, the disinfectant concentration in seawater that is deemed appropriate is determined in advance. Next, while receiving the supply of the disinfectant, the concentration of the disinfectant in the seawater to be injected into the ballast tank is measured. Thereafter, the measured disinfectant concentration is compared with the predetermined disinfectant concentration, and it is determined whether the measured disinfectant concentration is more than or less than the predetermined disinfectant concentration. Then, by feedback control based on the determination result, output adjustment of a pump for supplying the disinfectant and adjustment of the opening degree of a valve provided in a disinfectant supply line are performed, thereby adjusting the supply amount of the disinfectant. Usually, the predetermined disinfectant concentration has a predetermined acceptable range. In this case, the amount of the disinfectant supplied as described above is adjusted so that the measured concentration of the disinfectant falls within this predetermined range (hereinafter also referred to as "target concentration range").

The concentration of the disinfectant in the seawater stored in the ballast tank after the disinfectant is supplied decreases with the lapse of time due to the reaction between the disinfectant and the organic matter in the seawater and the self-decomposition reaction of the disinfectant. As a result, there is a possibility that living organisms may regrow and plankton eggs may hatch in the seawater stored in the ballast tank. Therefore, the concentration of the residual disinfectant in the stored seawater (the concentration of the disinfectant remaining in the stored seawater after the lapse of a predetermined time) must be maintained to the extent that the regrowth of the aquatic organisms and the hatching of the plankton eggs can be suppressed.

The content of organic matter (water quality) in water to be used as ballast water (seawater, lake water, or river water, hereinafter collectively referred to as "raw water" in this specification) greatly varies depending on the port of call of the vessel. The extent of the reaction between the disinfectant and the organic matter in the raw water, in other words, the degree of decrease in the concentration of the disinfectant in the raw water over time, depends on the quality of the raw water. Therefore, conventionally, the target concentration range of the above-mentioned disinfectant concentration is set within a wide range higher than the disinfectant concentration set for standard water-quality raw water so that a sufficient residual disinfectant concentration can be maintained for raw water of various water quality, and the amount of the disinfectant supplied to the raw water is adjusted so that the concentration of the disinfectant in the raw water injected into the ballast tank falls within the target concentration range.

SUMMARY OF THE INVENTION

Technical Problem

If an oxidant is used as a disinfectant and the target concentration range of the oxidant concentration is set within a wide range higher than the disinfectant concentration set for standard water-quality raw water to treat raw water of various water quality, the cost for the oxidant increases. In addition, the amount of harmful substances, such as trihalomethane, generated in the raw water by reaction between the oxidant and the organic matter in the raw water increases. Harmful substances whose generation amount has increased may adversely affect the environment around the vessel due to the discharge of the ballast water from the ballast tank. In addition, when the residual oxidant in the ballast water is decomposed to render it harmless while discharging the ballast water from the ballast tank, the amount of a residual oxidant decomposing agent, which must be supplied to the ballast water to be discharged, must also be increased; therefore, the cost for the decomposing agent also increases.

Furthermore, if the raw water contains a large amount of organic matter, since the oxidant is consumed by the reaction between the organic matter and the oxidant, the concentration of the residual oxidant in the ballast water may sometimes become almost zero after one day from the stoppage of the supply of the oxidant into the raw water. In such a case, the capacity of processing the living organisms in the ballast water by the oxidant (the capacity to kill plankton and bacteria contained in the ballast water) is insufficient, and it is difficult to fulfill the IMO ballast water treatment standard.

An object of the present invention is to provide a ballast water treatment device and a ballast water treatment method that can set a supply amount of an oxidant, which is necessary to secure a sufficient residual oxidant concentration for maintaining the capacity of processing living organisms in ballast water even after a long time has elapsed since the supply of the oxidant to the raw water was stopped, to a proper amount corresponding to the water quality of the raw water.

Solution to Problem

Various organic matter exists in seawater, lake water, and river water taken in as ballast water (hereinafter collectively referred to as "raw water" in this specification), and the organic matter greatly affects the water quality of the raw water. The organic matter is roughly divided into a water-soluble dissolved organic matter and a water-insoluble non-dissolved organic matter. The dissolved organic matter occupies a high proportion of the organic matter as a whole. In order to supply the oxidant in an appropriate amount to raw water of various water quality, it is necessary to accurately ascertain the water quality of the raw water to be treated. The inventors of the present application measured the absorbance and the concentration of dissolved organic carbon (DOC concentration), which is a representative dissolved organic matter, in various seawater, lake water, and river water, and thereby, found that there is a correspondence relationship which can achieve a substantially straight-line approximation between the absorbance and the DOC concentration. As a result, the DOC concentration can be derived from the measured value of the absorbance, and the water quality of the raw water can be ascertained from the derived DOC concentration.

It is known that, when the raw water is used as ballast water, if an oxidant is supplied to the raw water in order to kill plankton and bacteria present in the raw water, the oxidant is decomposed as a result of reaction with organic matter and ammonia in the raw water, and the residual oxidant concentration (Total residual oxidant concentration: TRO concentration) in the raw water decreases with time.

FIG. 1 is a diagram showing a state in which the TRO concentration in raw water decreases with time. The horizontal axis represents elapsed time (minutes), and the vertical axis represents TRO concentration (mg/L). In the case of using sodium hypochlorite as the oxidant, the TRO concentration is the residual chlorine concentration. The inventors of the present application have found that, when the oxidant is supplied to the raw water, the TRO concentration in the raw water decreases curvilinearly through three reactions of an instantaneous reaction, an initial reaction, and an intermediate reaction in this order, as shown in FIG. 1. Here, the "instantaneous reaction" is a reaction between an oxidant and mainly ammonia, the "initial reaction" is a reaction between an oxidant and mainly a dissolved organic matter, and "an intermediate reaction" is a reaction between an oxidant and mainly a non-dissolved organic matter and a reaction by self-decomposition of the oxidant. As shown in FIG. 1, the TRO concentration rapidly decreases in a short period of time by the instantaneous reaction immediately after the oxidant supply, then decreases more slowly as compared to the instantaneous reaction over the course of several minutes by the initial reaction, and decreases more slowly as compared to the initial reaction over a long period of time by the intermediate reaction. In addition, it was found that the larger the amount of organic matter in the raw water, the larger the decrease amount of the oxidant, especially, the decrease amount in the initial reaction.

In order to carry out the treatment satisfying the IMO ballast water treatment standard with respect to raw water, the minimum TRO concentration necessary to satisfy the IMO ballast water treatment standard must be secured at a point of time sufficiently after supplying the oxidant to the raw water (for example, after 24 hours). Therefore, in consideration of the fact that the TRO concentration decreases with time as shown in FIG. 1, the inventors conceived of setting the TRO concentration during the initial reaction, in which the oxidant reacts with the dissolved organic matter, as a control target value for use in adjusting the supply amount of the oxidant.

The TRO concentration set as the control target value for use in adjusting the supply amount of the oxidant is not the TRO concentration at the time of supplying the oxidant, but the TRO concentration during the initial reaction in which the oxidant and the dissolved organic matter react. As a result, it is possible to avoid an instantaneous reaction occurring prior to the initial reaction, that is, a reaction in which the oxidant and mainly ammonia react with each other to rapidly decrease the TRO concentration, from affecting the setting of the control target value of the TRO concentration. By setting the control target value in this way, it is possible to adjust the supply amount of the oxidant to an appropriate amount with less waste.

In this way, the dissolved organic carbon (DOC) concentration can be derived from the measurement value of the absorbance of the raw water to ascertain the water quality of the raw water, and the dissolved organic matter mainly reacts with the oxidant in the initial reaction described above. Based on those facts, the inventors of the present application focused on the correspondence relationship between the absorbance and the dissolved organic carbon concentration of raw water and the correspondence relationship between the dissolved organic carbon concentration and a decrease behavior of the TRO concentration in the initial reaction and the intermediate reaction, conceived of deriving the TRO concentration necessary to satisfy the IMO ballast water treatment standard and deriving the supply amount of the oxidant necessary to achieve this TRO concentration.

Furthermore, as an index for satisfying the IMO ballast water treatment standard, it is preferable to adopt a time integrated value (referred to as a CT value) of the TRO concentration over a predetermined period. FIG. 2 is a diagram for explaining the CT value of the TRO concentration indicated by the area between the curve representing the decrease behavior of the TRO concentration in FIG. 1 and the horizontal axis showing the elapsed time. In FIG. 2, the TRO concentration was changed from 5.0 mg/L at the time of oxidant supply to 2.5 mg/L at the elapse of 3 minutes, to 1.0 mg/L at the elapse of 360 minutes (6 hours), and to 0.4 mg/L at the elapse of 1440 minutes (one day) from the oxidant supply. In FIG. 2, the time integrated value, i.e., the CT value, of the TRO concentration over the period of 1440 minutes from the time of the oxidant supply (a time point in the intermediate reaction) is calculated. Here, the CT value corresponds to the area between the curve representing the decrease behavior of the TRO concentration in FIG. 2 and the horizontal axis showing the elapsed time from the time of the oxidant supply.

As an example, the inventors of the present application supplied oxidants of various concentrations to raw water having a DOC concentration of 2.0 mg/L as an example, and examined a decrease of the TRO concentration over time. Furthermore, when 1440 minutes (one day) had elapsed since the oxidant was supplied, the inventors conducted an experiment to investigate the CT value (the CT value during the period of 1440 minutes from the oxidant supply time) necessary to secure the TRO concentration that satisfies the IMO ballast water treatment standard. Furthermore, the inventors of the present application also conducted the same experiments on raw water having a DOC concentration different from that in the above example. As a result of these experiments, the inventors derived the conclusions that the initial reaction in which the oxidant and the dissolved organic matter reacts is completed in a few minutes, and that if the CT value is 1500 mg/L·minute or more, the TRO concentration sufficiently satisfying the IMO ballast water treatment standard can be secured even after 1440 minutes (one day) from the oxidant supply time.

In addition, as described above, the TRO concentration set as the control target value for use in adjusting the supply amount of the oxidant may be not the TRO concentration at the time of supplying the oxidant, but the TRO concentration during the initial reaction in which the oxidant and the dissolved organic matter react. Since the initial reaction is completed in a few minutes, the TRO concentration at the time when 3 minutes have elapsed since the oxidant was supplied (referred to as the TRO concentration at the elapse of 3 minutes) is set as the control target value for the TRO concentration during the initial reaction. By setting the CT value during the period of 1440 minutes (one day) from the oxidant supply time to 1500 mg/L·minute or more, the TRO concentration that fully satisfies the IMO ballast water treatment standard can be secured even after the elapse of 1440 minutes (one day) from the oxidant supply time. Therefore, a curve representing the decrease behavior of the TRO concentration that can set the CT value to 1500 mg/L·minute or more is selected, the TRO concentration at the elapse of 3 minutes on the curve representing the decrease behavior is set as a required TRO concentration, and this required TRO concentration is set as a control target value. In the example of FIG. 2, the CT value is 1500 mg/L·minute or more, and this satisfies the IMO ballast water treatment standard. On the curve representing this decrease behavior, since the TRO concentration at the lapse of 3 minutes is 2.5 mg/L, the required TRO concentration is 2.5 mg/L. Therefore, the supply amount of the oxidant can be adjusted by setting the control target value of the TRO concentration at the elapse of 3 minutes after the supply of the oxidant to 2.5 mg/L.

The present invention relates to a ballast water treatment device and a ballast water treatment method, in which the correspondence relationship between the absorbance and the DOC concentration of the raw water, and the correspondence relationship between the DOC concentration of the raw water and the TRO concentration required at the time point when a predetermined time has elapsed since the supply of the oxidant are acquired in advance, based on the correspondence relationships, the required TRO concentration at the time when the predetermined time has elapsed since the supply of the oxidant, which is necessary for satisfying the ballast water treatment standard, is set as the control target value, and based on the control target value, the supply amount of the oxidant is adjusted.

The absorbance of the raw water can be obtained by measuring the light transmittance. The light transmittance is the rate at which incident light transmits through a sample, and there is a relationship of absorbance=$-\log_{10}$ (light transmittance). In the present invention, the ballast water treatment may be performed by measuring the light transmittance of the raw water instead of the absorbance of the raw water.

According to the present invention, as described below, first to fourth inventions concerning the ballast water treatment device and fifth to eighth inventions relating to the ballast water treatment method are obtained.

<Ballast Water Treatment Device>

Each of the ballast water treatment devices concerning the first to fourth inventions comprises an oxidant supply device that supplies an oxidant to raw water (including sea water, lake water and river water) to be taken in as ballast water into a ballast tank of a vessel to kill living organisms in the raw water, and an oxidant supply amount control device that controls a supply amount of the oxidant supplied by the oxidant supply device to the raw water to be taken in.

<First Invention>

In the first invention concerning the above described ballast water treatment device, the oxidant supply amount control device includes an absorbance meter that measures absorbance of the raw water to be taken in, a storage unit, a calculation unit, and a control unit. The storage unit is configured to store a correspondence relationship between the absorbance of the raw water and a concentration of dissolved organic carbon of the raw water as a first correspondence relationship, and to store a correspondence relationship between the concentration of the dissolved organic carbon of the raw water and a required residual oxidant concentration as a second correspondence relationship. The required residual oxidant concentration is a concentration of a residual oxidant required as a residual oxidant concentration at a point of time when a predetermined time has elapsed since the oxidant was supplied to the raw water, to kill living organisms in the raw water and to suppress regrowth of the living organisms in the ballast water stored in the ballast tank. The calculation unit is configured to derive the concentration of the dissolved organic carbon corresponding to the absorbance of the raw water measured by the absorbance meter by referring to the first correspondence relationship, then to derive the required residual oxidant concentration corresponding to the derived concentration of the dissolved organic carbon by referring to the second correspondence relationship, and to calculate a required supply amount of the oxidant using the derived required residual oxidant concentration as a control target value. The control unit is configured to control the oxidant supply device so as to supply the oxidant of the required supply amount calculated by the calculation unit to the raw water to be taken in.

As described above, in the first invention, the concentration of the residual oxidant remaining in the ballast water and required at a point of time after a predetermined time has elapsed since the oxidant was supplied to the raw water (required residual oxidant concentration) is derived by referring to the first and second correspondence relationships stored in the storage unit, according to the actually measured absorbance of the raw water, to satisfy the IMO ballast water treatment standard, and this required residual oxidant concentration is set as a control target value. Therefore, an appropriate amount of the oxidant that fully satisfies the IMO ballast water treatment standard can be supplied to the raw water in accordance with the water quality of the raw water. The required residual oxidant concentration derived by the calculation unit in the first invention is not the concentration of the oxidant in the raw water at the oxidant supply time, but the concentration of the oxidant remaining in the raw water at the point of time when a predetermined time has elapsed since the oxidant was supplied. Therefore, by setting, for example, the aforementioned point of time when the predetermined time has elapsed, to a point of time when the reaction between the oxidant and the dissolved organic matter in the raw water is carried out, the appropriate amount of the oxidant can be calculated more accurately.

<Second Invention>

In the second invention concerning the above described ballast water treatment device, the oxidant supply amount control device includes an absorbance meter that measures absorbance of the raw water to be taken in, a storage unit, a calculation unit, and a control unit. The storage unit is configured to store a correspondence relationship between the absorbance of the raw water and a required residual oxidant concentration. The required residual oxidant concentration is a concentration of a residual oxidant required as a residual oxidant concentration at a point of time when a predetermined time has elapsed since the oxidant was supplied to the raw water, to kill the living organisms in the raw water and to suppress regrowth of the living organisms in the ballast water stored in the ballast tank. The calculation unit is configured to derive the required residual oxidant concentration corresponding to the absorbance of the raw water measured by the absorbance meter by referring to the correspondence relationship and to calculate a required supply amount of the oxidant by using the derived required residual oxidant concentration as a control target value. The control unit is configured to control the oxidant supply device so as to supply the oxidant of the required supply amount calculated by the calculation unit to the raw water to be taken in.

As described above, in the second invention, the concentration of the residual oxidant remaining in the ballast water and required to satisfy the IMO ballast water treatment standard at a point of time after a predetermined time has elapsed since the oxidant was supplied to the raw water (required residual oxidant concentration) is derived by referring to the correspondence relationship stored in the storage unit, according to the actually measured absorbance of the raw water, to satisfy the IMO ballast water treatment standard, and this required residual oxidant concentration is set as a control target value. Therefore, as in the first invention described above, an appropriate amount of the oxidant that fully satisfies the IMO ballast water treatment standard can be supplied to the raw water in accordance with the water quality of the raw water. What is referred to at this time is only a direct correspondence relationship between the absorbance of the raw water and the concentration of the residual oxidant which remains in the raw water at the time point when the predetermined time has elapsed since the oxidant was supplied to the raw water, and which is required to satisfy the IMO ballast water treatment standard (the required residual oxidant concentration). Therefore, as compared with the case of referring to the first and second correspondence relationships as in the first invention, the required residual oxidant concentration can be derived more easily.

<Third Invention>

In the third invention concerning the above described ballast water treatment device, the oxidant supply amount control device includes a light transmittance meter that measures light transmittance of the raw water to be taken in, a storage unit, a calculation unit, and a control unit. The storage unit is configured to store a correspondence relationship between the light transmittance of the raw water and a concentration of dissolved organic carbon of the raw water as a first correspondence relationship, and to store a correspondence relationship between the concentration of the dissolved organic carbon of the raw water and a required residual oxidant concentration as a second correspondence relationship. The required residual oxidant concentration is a concentration of a residual oxidant required as a residual oxidant concentration at a point of time when a predetermined time has elapsed since the oxidant was supplied to the raw water, to kill living organisms in the raw water and to suppress regrowth of the living organisms in the ballast water stored in the ballast tank. The calculation unit is configured to derive the concentration of the dissolved organic carbon corresponding to the light transmittance of the raw water measured by the light transmittance meter by referring to the first correspondence relationship, then to derive the required residual oxidant concentration corresponding to the derived concentration of the dissolved organic carbon by referring to the second correspondence relationship, and to calculate a required supply amount of the oxidant using the derived required residual oxidant concentration as a control target value. The control unit is configured to control the oxidant supply device so as to supply the oxidant of the required supply amount calculated by the calculation unit to the raw water to be taken in.

<Fourth Invention>

In the fourth invention concerning the above described ballast water treatment device, the oxidant supply amount control device includes a light transmittance meter that measures light transmittance of the raw water to be taken in, a storage unit, a calculation unit, and a control unit. The storage unit is configured to store a correspondence relationship between the light transmittance of the raw water and a required residual oxidant concentration. The required residual oxidant concentration is a concentration of a residual oxidant required as a residual oxidant concentration at a point of time when a predetermined time has elapsed since the oxidant was supplied to the raw water, to kill living organisms in the raw water and to suppress regrowth of the living organisms in the ballast water stored in the ballast tank. The calculation unit is configured to derive the required residual oxidant concentration corresponding to the light transmittance of the raw water measured by the light transmittance meter with reference to the correspondence relationship and to calculate a required supply amount of the oxidant by using the derived required residual oxidant concentration as a control target value. The control unit is configured to control the oxidant supply device so as to supply the oxidant of the required supply amount calculated by the calculation unit to the raw water to be taken in.

<Ballast Water Treatment Method>

Each of the ballast water treatment methods concerning the fifth to eighth inventions comprises an oxidant supply step of supplying an oxidant to raw water to be taken in as ballast water into a ballast tank of a vessel to kill living organisms in the raw water, and an oxidant supply amount control step of adjusting a supply amount of the oxidant supplied to the raw water in the oxidant supplying step.

<Fifth Invention>

In the fifth invention concerning the above described ballast water treatment method, the oxidant supply amount control step includes an absorbance measurement step of measuring absorbance of the raw water to be taken in, a dissolved organic carbon concentration derivation step, a required residual oxidant concentration derivation step, a required oxidant supply amount calculation step, and a control step. The dissolved organic carbon concentration derivation step derives a concentration of a dissolved organic carbon corresponding to the absorbance of the raw water measured in the absorbance measurement step, by referring to a first correspondence relationship, which is a correspondence relationship between the absorbance of the raw water and the concentration of the dissolved organic carbon in the raw water and which has been acquired in advance. The required residual oxidant concentration derivation step derives a required residual oxidant concentration corresponding to the concentration of a dissolved organic carbon derived in the dissolved organic carbon concentration derivation step, by referring to a second correspondence relationship, which is a correspondence relationship between the concentration of the dissolved organic carbon in the raw water and the required residual oxidant concentration and which has been acquired in advance. The required residual oxidant concentration is a concentration of a residual oxidant required as a residual oxidant concentration at a point of time when a predetermined time has elapsed since the oxidant was supplied to the raw water, to kill the living organisms in the raw water and to suppress regrowth of the living organisms in the ballast water stored in the ballast tank. The required oxidant supply amount calculation step calculates a required supply amount of the oxidant using the required residual oxidant concentration derived in the required residual oxidant concentration derivation step as a control target value. The control step controls the oxidant supply step so as to supply the oxidant of the required supply amount calculated by the required oxidant supply amount calculation step to the raw water to be taken in.

<Sixth Invention>

In the sixth invention concerning the above described ballast water treatment method, the oxidant supply amount control step includes an absorbance measurement step of measuring absorbance of the raw water to be taken in, a required residual oxidant concentration derivation step, a required oxidant supply amount calculation step, and a control step. The required residual oxidant concentration derivation step derives a required residual oxidant concentration corresponding to the absorbance of the raw water measured by the absorbance measurement step, by referring to a correspondence relationship between the absorbance of the raw water and the required residual oxidant concentration and which has been acquired in advance. The required residual oxidant concentration is a concentration of a residual oxidant required as a residual oxidant concentration at a point of time when a predetermined time has elapsed since the oxidant was supplied to the raw water, to kill the living organisms in the raw water and to suppress regrowth of the living organisms in the ballast water stored in the ballast tank. The required oxidant supply amount calculation step calculates a required supply amount of the oxidant using the required residual oxidant concentration derived in the required residual oxidant concentration derivation step as a control target value. The control step controls the oxidant supply step so as to supply the oxidant of the required supply amount calculated by the required oxidant supply amount calculation step to the raw water to be taken in.

<Seventh Invention>

In the seventh invention concerning the above described ballast water treatment method, the oxidant supply amount control step includes a light transmittance measurement step of measuring light transmittance of the raw water to be taken in, a dissolved organic carbon concentration derivation step, a required residual oxidant concentration derivation step, a required oxidant supply amount calculation step, and a control step. The dissolved organic carbon concentration derivation step derives a concentration of a dissolved organic carbon corresponding to the light transmittance of the raw water measured in the light transmittance measurement step, by referring to a first correspondence relationship, which is a correspondence relationship between the light transmittance of the raw water and the concentration of the dissolved organic carbon in the raw water and which has been acquired in advance. The required residual oxidant concentration derivation step derives a required residual oxidant concentration corresponding to the concentration of the dissolved organic carbon of the raw water derived in the dissolved organic carbon concentration derivation step, by referring to a second correspondence relationship, which is a correspondence relationship between the concentration of the dissolved organic carbon in the raw water and the required residual oxidant concentration and which has been acquired in advance. The required residual oxidant concentration is a concentration of a residual oxidant required as a residual oxidant concentration at a point of time when a predetermined time has elapsed since the oxidant was supplied to the raw water, to kill the living organisms in the raw water and to suppress regrowth of the living organisms in the ballast water stored in the ballast tank. The required oxidant supply amount calculation step calculates a required supply amount of the oxidant by using the required residual oxidant concentration derived by the required residual oxidant concentration derivation step as a control target value. The control step controls the oxidant supply step so as to supply the oxidant of the required supply amount calculated by the required oxidant supply amount calculation step to the raw water to be taken in.

<Eighth Invention>

In the eighth invention concerning the above described ballast water treatment method, the oxidant supply amount control step includes a light transmittance measurement step of measuring light transmittance of the raw water to be taken in, a required residual oxidant concentration derivation step, a required oxidant supply amount calculation step, and a control step. The required residual oxidant concentration derivation step derives a required residual oxidant concentration corresponding to the light transmittance of the raw water measured by the light transmittance measurement step, by referring to a correspondence relationship between the light transmittance of the raw water and the required residual oxidant concentration and which has been acquired in advance. The required residual oxidant concentration is a concentration of a residual oxidant required as a residual oxidant concentration at a point of time when a predetermined time has elapsed since the oxidant was supplied to the raw water, to kill the living organisms in the raw water and to suppress regrowth of the living organisms in the ballast water stored in the ballast tank. The required oxidant supply amount calculation step calculates a required supply amount of the oxidant using the required residual oxidant concentration derived in the required residual oxidant concentration deriving step as a control target value. The control step controls the oxidant supply step so as to supply the oxidant of the required supply amount calculated by the required oxidant supply amount calculation step to the raw water to be taken in.

Advantageous Effects of Invention

According to the ballast water treatment device and the ballast water treatment method of the present invention, the required residual oxidant concentration in accordance with the actually measured absorbance or the light transmittance of the raw water taken is acquired by referring to the correspondence relationships stored in the storage unit, and this required residual oxidant concentration is set as the control target value. Therefore, an appropriate amount of the oxidant (required supply amount of the oxidant) necessary to satisfy the IMO ballast water treatment standard can be supplied to the taken-in raw water in accordance with the water quality of the raw water. Therefore, it is possible to reduce the cost of the ballast water treatment, and to suppress the generation amount of harmful substances such as trihalomethane generated by reaction of the oxidant with the organic matter in the raw water, thereby preventing harmful substances from adversely affecting the surrounding environment. Also, it is possible to reduce the amount of the oxidant decomposing agent required to decompose the oxidant remaining in the ballast water to render it harmless when discharging the ballast water from the ballast tank. As a result, it is possible to reduce the cost required for discharging the ballast water from the ballast tank.

In addition, according to the present invention, the required residual oxidant concentration derived by referring to the aforementioned correspondence relationships is the concentration of the residual oxidant required as the residual oxidant concentration at the point of time when a predetermined time has elapsed since the oxidant was supplied to the raw water, to kill the living organisms in the raw water and to suppress the regrowth of the living organisms in the ballast water stored in the ballast tank. By setting, for example, the aforementioned point of time to the time when the reaction between the oxidant and the dissolved organic matter is carried out, the appropriate required supply amount of the oxidant can be determined more accurately.

DETAILED DESCRIPTION OF THE INVENTION

Hereinafter, embodiments of the present invention will be described with reference to the accompanying drawings.

First Embodiment

Figure 3:
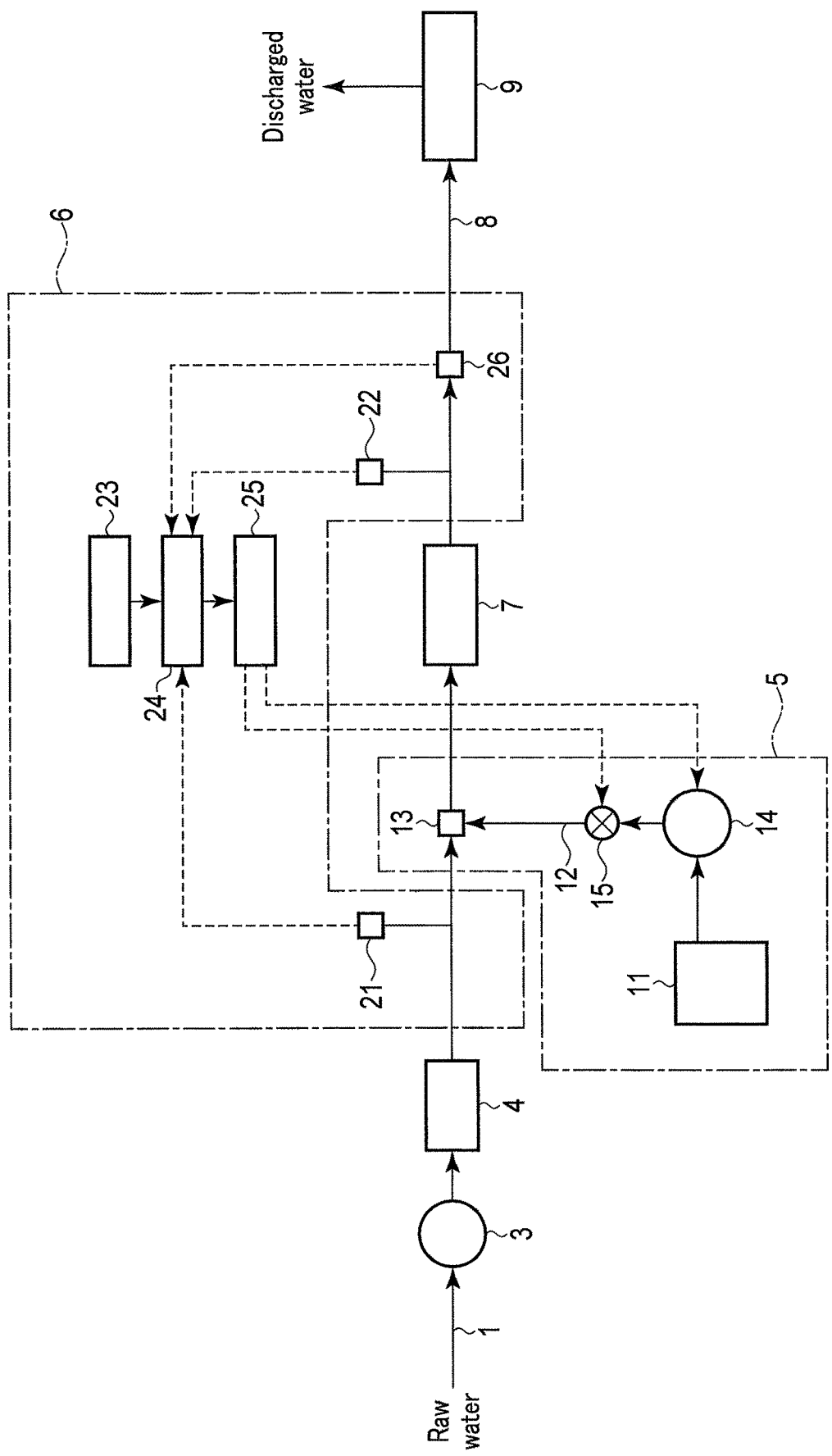
FIG. 3 is a diagram schematically showing a configuration of a ballast water treatment device according to an embodiment.

In the present embodiment, a case where living organisms in raw water are killed at the time of loading ballast water will be described. First, a configuration of a ballast water treatment device according to this embodiment will be described in detail. FIG. 3 is a diagram schematically showing a configuration of the ballast water treatment device according to the embodiment. The ballast water treatment device of the present embodiment is provided on a body of a vessel (not shown) and includes a raw water intake line 1, a pump 3 and a filtering device 4 provided on the raw water intake line 1, an oxidant supply device 5 and an oxidant supply amount control device 6 that are connected to the raw water intake line 1, a mixing device 7 connected at an end of the raw water intake line 1, and a sterilized water supply line 8 extending from the mixing device 7 to a ballast tank 9.

The raw water intake line 1 takes in raw water (seawater, lake water, or river water) around the vessel body through a raw water supply port of the vessel body by operation of the pump 3. The pump 3 takes raw water into the raw water intake line 1 and supplies it to the ballast tank 9. The filtering device 4 is provided on the downstream side of the pump 3 on the raw water intake line 1 and filters the raw water taken into the raw water intake line 1 to remove the living organisms including relatively large plankton present in the raw water.

The oxidant supply device 5 is connected to the raw water intake line 1 via an inlet port 13 on the downstream side of the filtering device 4 on the raw water intake line 1. In the oxidant supply device 5, an oxidant as a disinfectant is supplied to the raw water (filtered water) filtered by the filtering device 4 via the inlet port 13. In the filtering device 4, microorganisms including bacteria and plankton, which have not been filtered, are killed. The oxidant supply amount control device 6 controls the oxidant supply device 5 to adjust the supply amount of the oxidant supplied from the oxidant supply device 5 to the raw water in the raw water intake line 1. The mixing device 7 is connected to an end of the raw water intake line 1 on the downstream side of the inlet port 13 of the oxidant supply device 5. The filtered raw water (filtered water) supplied with the oxidant by the oxidant supply device 5 is introduced into the mixing device 7 from the end of the raw water intake line 1, the filtered raw water (filtered water) and the oxidant are mixed, and the oxidant is sufficiently diffused into the filtered raw water (filtered water). As a result, living organisms including microorganisms in the filtered raw water (filtered water) are killed.

The sterilized water supply line 8 supplies the raw water (hereinafter referred to as sterilized water), in which living organisms including microorganisms have been killed, from the mixing device 7 to the ballast tank 9. The ballast tank 9 is connected to the end of the sterilized water supply line 8, and stores the sterilized water supplied through the sterilized water supply line 8 as ballast water.

In the following, the aforementioned plurality of constituent elements of the ballast water treatment device of the present embodiment will be described in more detail.

Filtering Device 4:

The filtering device 4 removes from the raw water the living organisms including relatively large plankton contained in the raw water taken into the raw water intake line 1 by the pump 3 through the raw water suction port provided on the side surface of the vessel body (not shown) as described above. The filtering device 4 of this embodiment is provided with a filter having a sieve opening of 10 to 200 μm. A filter with the sieve opening of 10 to 200 μm keeps the capture rate of zooplankton and phytoplankton at a certain level while decreasing the frequency of back washing of the filter to shorten the ballast water treatment time at the port of call. In other words, filters with sieve openings outside the above range are not preferable, because when the sieve opening of the filter is larger than 200 μm, the capture rate of zooplankton and phytoplankton becomes remarkably low, and when the sieve opening of the filter is smaller than 10 μm, the frequency of back washing increases and the ballast water treatment time becomes long. In particular, it is preferable to use a filter with a sieve opening of about 20 to 35 μm, because the capture rate and the frequency of back washing can be optimized. Further, it is desirable that the filtering device 4 can obtain a filtration rate (capacity) of 200 $m^3$ or more per hour. However, if the aforementioned filtration rate (capacity) is obtained, the filtration area can be reduced by accumulating a plurality of filtering modules.

Oxidant Supply Device 5:

As shown in FIG. 3, the oxidant supply device 5 includes an oxidant storage tank 11 that stores an oxidant, a pipe 12 extending from the oxidant storage tank 11 on the downstream side of the filtering device 4 toward the raw water intake line 1, the inlet port 13 provided at the end of the pipe 12 and connected to the raw water intake line 1, a supply pump 14 that is provided on the pipe 12 and that supplies the oxidant in the oxidant storage tank 11 to the inlet port 13, and a valve 15 that is provided on the pipe 12 on the downstream side of the supply pump 14 and that adjusts the supply amount of the oxidant supplied from the oxidant storage tank 11 to the inlet port 13, in this embodiment, to the filtered raw water (filtered water) in the raw water intake line 1 via the supply pump 14.

As the oxidant, sodium hypochlorite, chlorine, chlorine dioxide, sodium dichloroisocyanurate, or a mixture of two or more of these can be used; however, it is also possible to use any other oxidant.

In the oxidant supply device 5, an oxidant is supplied to raw water taken into the raw water intake line 1, in this embodiment, filtered raw water (filtered water) in the raw water intake line 1 via the inlet port 13. As will be described later, the oxidant supply device 5 is controlled by the oxidant supply amount control device 6 and capable of supplying an appropriate amount of the oxidant that can fully satisfy the IMO ballast water treatment standard into the raw water in the raw water intake line 1.

Mixing Device 7:

The mixing device 7 can be constituted by, for example, a stationary mixer (static mixer) or a stirring mixer of a stirring blade rotating type, or the like. The filtered raw water (filtered water) supplied with the oxidant by the oxidant supply device 5 is introduced into the mixing device 7 from the end of the raw water intake line 1, the filtered raw water (filtered water) and the oxidant are sufficiently mixed, and the oxidant is diffused into the filtered raw water (filtered water). The filtered raw water in which the oxidant is diffused by the mixing device 7 is referred to as sterilized water in this embodiment.

Oxidant Supply Amount Control Device 6:

The oxidant supply amount control device 6 includes an absorbance meter 21, which is disposed on the raw water intake line 1 on the upstream side of the oxidant supply device 5, in this embodiment, on the downstream side of the filtering device 4 and on the upstream side of the inlet port 13 of the oxidant supply device 5. The absorbance meter 21 measures the absorbance of the raw water (filtered water) taken into the raw water intake line 1 and filtered by the filtering device 4. The oxidant supply amount control device 6 further includes a TRO meter 22 and a flowmeter 26 provided on the downstream side of the oxidant supply device 5, in this embodiment, on the downstream side of the mixing device 7 on the sterilized water supply line 8. The TRO meter 22 measures a residual oxidant concentration (Total residual oxidant concentration: TRO concentration) in the sterilized water in the sterilized water supply line 8 to which the oxidant is supplied from the oxidant supply device 5; in this embodiment, the sterilized water in the sterilized water supply line 8 in which the oxidant is diffused by the mixing device 7 after the oxidant is supplied from the oxidant supply device 5. The flowmeter 26 measures the flow rate of the sterilized water to be supplied through the sterilized water supply line 8 from the mixing device 7 to the ballast tank 9. The oxidant supply amount control device 6 further includes a storage unit 23 configured to store first and second correspondence relationships to be described later, a calculation unit 24 configured to calculate a desired supply amount of the oxidant by referring to the first and second correspondence relationships stored in the storage unit 23, and a control unit 25 is configured to control the oxidant supply device 5 based on the required supply amount of the oxidant calculated by the calculation unit 24.

The absorbance meter 21 measures the absorbance as an indicator of the water quality of the raw water taken into the raw water intake line 1 and outputs the measurement data to the calculation unit 24. In the present embodiment, as described above, the absorbance meter 21 is provided on the raw water intake line 1 on the downstream side of the filtering device 4 and on the upstream side of the inlet port 13 of the oxidant supply device 5. Therefore, the absorbance meter 21 measures the absorbance of the raw water in the raw water intake line 1 before the oxidant is supplied from the oxidant supply device 5. The wavelength used when the absorbance meter 21 measures the absorbance of the raw water in the raw water intake line 1 is preferably 260 nm, which is suitable for using the absorbance as an indicator of the concentration of the organic matter in the raw water.

The TRO meter 22 measures the TRO concentration in the sterilized water in the sterilized water supply line 8 discharged from the mixing device 7 and supplied to the ballast tank 9 after the oxidant is supplied from the oxidant supply device 5, and outputs the measurement data to the calculation unit 24. In the present embodiment, the TRO meter 22 measures a TRO concentration (hereinafter referred to as "initial reaction TRO concentration") at a predetermined time point (in the present embodiment, 3 minutes after the supply of the oxidant) within an initial reaction time when the oxidant supplied to the raw water in the raw water intake line 1 from the oxidant supply device 5 reacts mainly with the dissolved organic carbon in the raw water. Therefore, the TRO meter 22 is provided at a downstream position on the sterilized water supply line 8 to which the sterilized water after the supply of the oxidant from the inlet port 13 of the oxidant supply device 5 reaches after 3 minutes. In addition, the TRO meter 22 measures the initial reaction TRO concentration during a fixed period of time (one minute in the present embodiment). In the present embodiment, the measurement timing of the initial reaction TRO concentration by the TRO meter 22 with respect to the sterilized water after the supply of the oxidant is set to be the time when 3 minutes elapse after supplying the oxidant to the raw water. However, the measurement timing may be any time within the initial reaction time.

The storage unit 23 stores the first correspondence relationship and the second correspondence relationship in advance as described below.

[First Correspondence Relationship]

The first correspondence relationship is the correspondence relationship between the absorbance of raw water and the concentration (DOC concentration) of dissolved organic carbon in the raw water. This first correspondence relationship is obtained as follows. First, absorbance and DOC concentration of raw water sampled from a plurality of water areas with different water qualities are measured. Next, the absorbance and the DOC concentration measured from raw water collected from the plurality of water areas are plotted, for example, on a graph in which the absorbance is plotted on the horizontal axis (x axis) and the DOC concentration is plotted on the vertical axis (y axis). Thereafter, the correspondence relationship between absorbance and DOC concentration for each raw water sampled from all water areas is linearly approximated. The relational expression (y=ax+b) as a linear function obtained by this linear approximation is the first correspondence relationship, and the first correspondence relationship is stored in advance by the storage unit 23.

[Second Correspondence Relationship]

The second correspondence relationship is the correspondence relationship between the concentration (DOC concentration) of dissolved organic carbon in the raw water and the required residual oxidant concentration. Here, the required residual oxidant concentration is the concentration of the residual oxidant required as the residual oxidant concentration at the point of time when a predetermined time has elapsed since the oxidant was supplied to the raw water, to kill the living organisms in the raw water and to suppress the regrowth of the living organisms in the ballast water stored in the ballast tank. The second correspondence relationship is obtained as follows. First, the DOC concentration of raw water sampled from a certain water area is measured. Further, oxidants of a plurality of kinds of concentrations are supplied to the raw water, and the decrease with time of the residual oxidant concentration (Total residual oxidant concentration: TRO concentration) is measured for the oxidant of each concentration.

Figure 1:
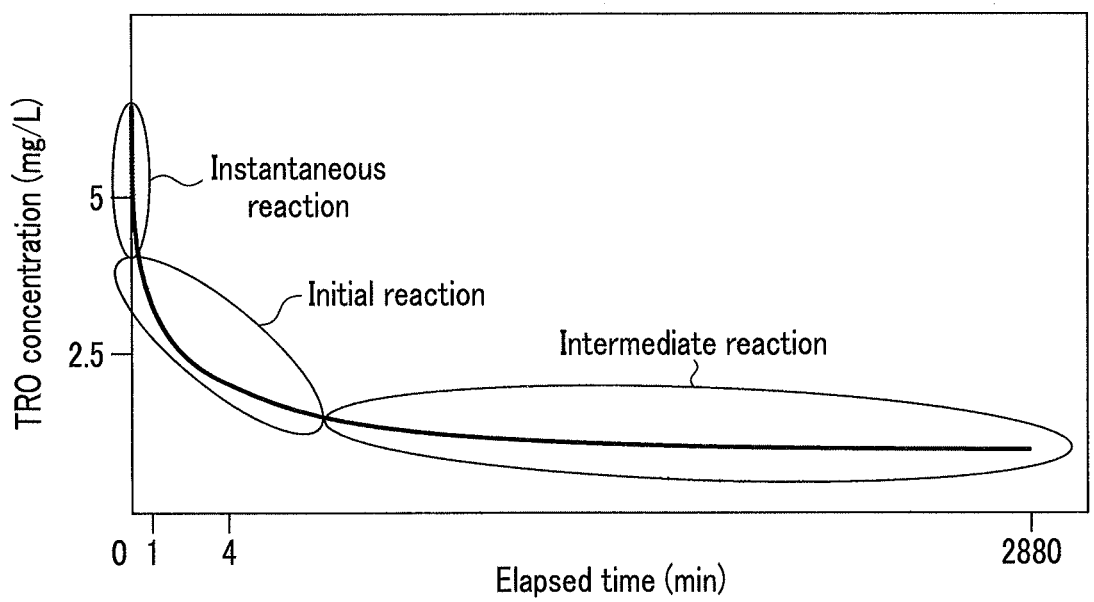
FIG. 1 is a diagram showing a state in which the TRO concentration in raw water decreases with time.
Figure 2:
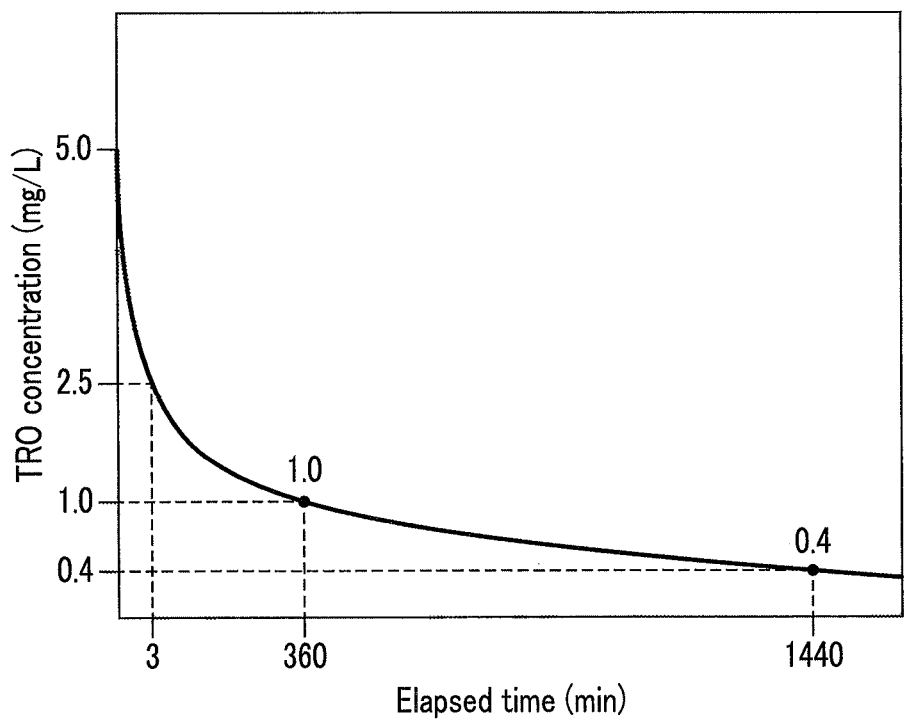
FIG. 2 is a diagram for explaining the CT value of the TRO concentration in the raw water.

Next, in the case of supplying the oxidants of a plurality of kinds of concentrations respectively, a time integration value (CT value) of the TRO concentration during the period from the supply of the oxidant up to a predetermined time point in the intermediate reaction (in the example of FIG. 2, 1440 minutes (one day) after supplying the oxidant) is calculated. Then, from the CT values obtained for the cases where the oxidants of the respective concentrations were supplied, a minimum CT value that satisfies the CT value sufficient to achieve the IMO ballast water treatment standard at 1440 minutes (one day) after the supply of the oxidant (1500 mg/L·minute in the example of FIG. 2) is selected. With respect to the case where the oxidant having the concentration at the selected CT value was supplied, the TRO concentration at the initial reaction time, that is, the TRO concentration at the time when 3 minutes passed since the oxidant was supplied (2.5 mg/L in the example of FIG. 2) is derived as the required TRO concentration. As a result, the required TRO concentration corresponding to the raw water having a certain DOC concentration is derived.

As described above, the DOC concentration and the required TRO concentration in each of the raw waters for the plurality of water areas are obtained, and the correspondence relationship integrating the correspondence relationship between the DOC concentration and the required TRO concentration of each of the raw waters is obtained as the second correspondence relationship. The second correspondence relationship is stored in advance together with the above-described first correspondence relationship by the storage unit 23.

The calculation unit 24 refers to the first correspondence relationship stored in the storage unit 23 and derives the DOC concentration corresponding to the absorbance of the raw water measured by the absorbance meter 21. Further, the calculation unit 24 refers to the second correspondence relationship stored in the storage unit 23 to derive the required TRO concentration corresponding to the DOC concentration derived as described above, and the required supply amount of the oxidant is periodically calculated to achieve the derived required TRO concentration as the control target value. Specifically, the calculation unit 24 calculates the required supply amount of the oxidant for each control update timing of the predetermined cycle according to the following equation (1), and updates the required supply amount of the oxidant.

$$m_m = m_{m-1} + a \times (PV_m - SV) \times Q_{AVE,\,n-1}/Q_r \times G \quad (1)$$

$m_m$: Required supply amount of the oxidant at present time (L/min)

$m_{m-1}$: Required supply amount of the oxidant at previous time (L/min)

$PV_m$: Measurement value of TRO concentration at present time (mg/L)

SV: TRO control target value (mg/L)

$Q_r$: Rated flow rate of sterilized water (m$^2$/H)

$Q_{AVE,\,n-1}$: Average value (m$^3$/H) of measurement values of flow rates of the sterilized water at present time (In the present embodiment, the average value of the measurement values of the sterilized water flow rates in ten seconds immediately before the control update timing)

a: Amount of the oxidant (L/min) supplied to make the oxidant concentration 1 mg/L at rated flow rate $Q_r$ of sterilized water G: Gain The control unit 25 controls the rotation speed of the supply pump 14 and the opening degree of the valve 15 of the oxidant supply device 5 based on the required supply amount of the oxidant calculated by the calculation unit 24. As a result, the oxidant supply device 5 supplies the required supply amount of the oxidant calculated by the calculation unit 24 from the inlet port 13 to the raw water in the raw water intake line 1.

Next, overall operations of the ballast water treatment device according to the present embodiment will be described. At the time of loading raw water into the ballast tank 9, the pump 3 on the raw water intake line 1 is operated to take the raw water into the vessel body through the raw water intake line 1, and then the filtering device 4 on the raw water intake line 1 removes plankton or the like larger than the sieve opening of the filter of the filtering device 4 from the raw water in the raw water intake line 1.

Next, an oxidant is supplied by the oxidant supply device 5 to the raw water (filtered water) filtered by the filtering device 4. Specifically, the supply pump 14 on the pipe 12 of the oxidant supply device 5 is operated and the valve 15 on the pipe 12 is opened, so that the oxidant stored in the oxidant storage tank 11 is supplied through the inlet port 13 to the raw water (filtered water) in the raw water intake line 1. The supply amount of the oxidant is adjusted by controlling the rotation speed of the supply pump 14 and the opening degree of the valve 15 by the oxidant supply amount control device 6. The control of the supply amount of the oxidant by the oxidant supply amount control device 6 will be described later.

After the oxidant is supplied to the filtered raw water (filtered water), the mixing device 7 mixes the filtered raw water with the oxidant, so that the oxidant is sufficiently diffused into the filtered raw water (filtered water). As a result, living organisms in the filtered raw water (filtered water) are killed. The filtered water in which the living organisms have been killed is discharged as sterilized water from the mixing device 7.

The sterilized water discharged from the mixing device 7 into the sterilized water supply line 8 is stored as ballast water in the ballast tank 9 through the sterilized water supply line 8. Although the concentration of the oxidant in the ballast water in the ballast tank 9 decreases with time, the oxidant remaining in the ballast water can suppress the regrowth of living organisms in the ballast water (for example, regrowth of aquatic organisms or hatching of plankton eggs).

When discharging the ballast water from the ballast tank 9, an oxidant decomposing agent supply device (not shown) supplies a decomposing agent for decomposing the oxidant to the ballast water discharged from the ballast tank 9 to detoxify the ballast water.

Hereinafter, a control operation for the supply amount of the oxidant by the oxidant supply amount control device 6 during the operation of the ballast water treatment device will be described. As will be described later, the operations of the ballast water treatment device includes "an initial supply mode operation" which is performed from the beginning of operation, namely, from the time when the intake of the raw water into the raw water intake line 1 is started, until a fixed time has elapsed, and "a TRO control mode operation" performed from the end of the initial supply mode operation until the end of the treatment for killing the living organisms in the raw water.

[Initial Supply Mode Operation]

In the "fixed time" in which the initial supply mode operation is performed, a time equal to or longer than the control update cycle time in the TRO control mode operation to be described later is set. In this embodiment, as will be described later, the control update cycle time is set to 6 minutes, and the "fixed time" is set to 10 minutes, which is calculated by adding a margin time of 4 minutes to the 6 minutes.

In the initial supply mode operation, a certain amount of the oxidant is excessively supplied to the filtered raw water in order to secure the living organisms killing treatment for the filtered raw water (in this embodiment, filtered water).

[TRO Control Mode Operation]

The cycle time (control update cycle time) of the operation of controlling the supply amount of the oxidant during the TRO control mode operation is set to a time equal to or longer than the total time of a time required for the filtered raw water (filtered water in this embodiment) supplied with the oxidant to reach the position of the TRO meter 22 (three minutes in the present embodiment) and a time required for measuring the TRO concentration by the TRO meter 22 (one minute in the present embodiment). In the present embodiment, 6 minutes, which is the total time (four minutes) plus the margin time of two minutes, is set as the control update cycle time.

Figure 4:
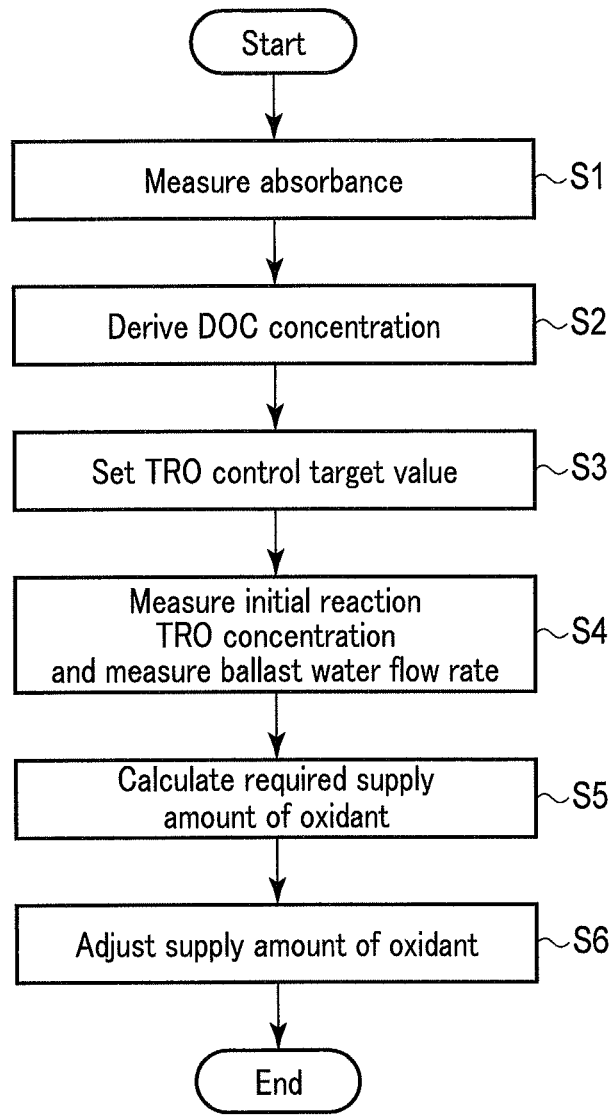
FIG. 4 is a flowchart showing an operation for controlling the supply amount of the oxidant performed by the ballast water treatment device of FIG. 3.

FIG. 4 is a flowchart showing an operation for controlling the supply amount of the oxidant performed in the TRO control mode operation. First, when the raw water is taken into the ballast tank 9, the absorbance of the raw water (raw water before supply of the oxidant) filtered by the filtering device 4 is measured by the absorbance meter 21 (S1). The measurement value of the measured absorbance is output to the calculation unit 24. In the present embodiment, the absorbance is measured a plurality of times in two minutes after the elapse of eight minutes from the start of the initial supply mode operation, and the calculation unit 24 calculates an average value of measured values of the absorbance.

The calculation unit 24 refers to the first correspondence relationship stored in the storage unit 23 and derives the DOC concentration corresponding to the average value of the measured values of the absorbance (S2).

Next, the calculation unit 24 refers to the second correspondence relationship stored in the storage unit 23, derives the required TRO concentration corresponding to the DOC concentration derived in S2, and sets the derived required TRO concentration as a TRO control target value (S3). This required TRO concentration is the TRO concentration required at the initial reaction. It is preferable that a dead zone of a certain range is set for the TRO control target value.

Subsequent to S3, the TRO meter 22 measures the TRO concentration at the time when a predetermined time has elapsed since the oxidant was supplied to the filtered raw water to be supplied to the ballast tank 9, namely, the initial reaction TRO concentration, and the flowmeter 26 measures the flow rate of the sterilized water to be supplied to the ballast tank 9 after the oxidant is supplied (S4). Data of the measured initial reaction TRO concentration and the flow rate is output to the calculation unit 24. The calculation unit 24 calculates the average value of the measurement values of the flow rate of the sterilized water in ten seconds immediately before the control update timing of the supply amount of the oxidant.

The calculation unit 24 calculates the required supply amount $m_m$ of the oxidant at the control update timing at present time based on the above equation (1) (S5). At this time, in the equation (1), the value derived in S3 is used as the target value SV (mg/L) of the TRO control, and the values obtained in S4 are used as the average value $Q_{AVE, n-1}$ ($m^2$/H) of the measurement values of the flow rate of the ballast water and the measurement value $PV_m$ (mg/L) of the TRO concentration at present time.

The gain G in equation (1) is set to a value larger than 1, for example, 1.5, when the value of $PV_m$-SV, that is, the difference between the measurement value of the TRO concentration at present time and the target value of TRO control is 0 or less, and set to 1, when the difference is larger than 0. The reason for setting the gain G in this way is as follows.

When the difference between the measurement value of the TRO concentration at the present time and the target value of TRO control is 0 or less, that is, when the measurement value of the TRO concentration at the present time is lower than the target value of the TRO control, a control of increasing the required supply amount of oxidant is performed. However, when the supply amount of the oxidant is large, the decrease of the TRO concentration due to the instantaneous reaction becomes large. Therefore, if the gain G is 1 or less, since the decrease in the TRO concentration due to the instantaneous reaction is large regardless of the increase of the required supply amount of the oxidant, the initial reaction TRO concentration after 3 minutes from the supply of the oxidant may be lower than the target value of the TRO control. Therefore, by setting the gain G to a value larger than 1, it is possible to bring the initial reaction TRO concentration closer to the target value of the TRO control. Furthermore, for example, even when it is reasonable to set the gain G to about 1.2, in order to cause the initial reaction TRO concentration to reach the target value of the TRO control at an early stage, the gain G is preferably set to a slightly higher value (for example, about 1.5).

When the difference between the measurement value of the TRO concentration at the present time and the target value of TRO control is larger than 0, that is, when the measurement value of the TRO concentration at the present time is higher than the target value of the TRO control, a control of reducing the required supply amount of oxidant is performed. When the supply amount of the oxidant is small, the decrease of the TRO concentration due to the instantaneous reaction is small. Therefore, if the gain G is larger than 1, since the decrease in the TRO concentration due to the instantaneous reaction is small regardless of the decrease of the required supply amount of the oxidant, the initial reaction TRO concentration after 3 minutes from the supply of the oxidant may be higher than the target value of the TRO control. Therefore, by setting the gain G to a value smaller than 1, it is possible to bring the initial reaction TRO concentration closer to the target value of the TRO control. Furthermore, for example, even when it is reasonable to set the gain G to about 0.7, in order to cause the initial reaction TRO concentration to reach the target value of the TRO control at an early stage, the gain G is preferably set to a slightly higher value (for example, about 1.0).

The control unit 25 controls the rotation speed of the supply pump 14 and the opening degree of the valve 15 so as to supply the oxidant to the raw water at the required supply amount $m_m$ of the oxidant calculated in S5, and adjusts the supply amount of the oxidant (S6).

In the present embodiment, in principle, the control operation of S4 to S6 is performed at every control update timing of a predetermined cycle set in advance. However, in the case where the initial reaction TRO concentration measured by the TRO meter 22 in S4 is within the range of the dead zone of the target value of the TRO control, S5 and S6 are not performed, and the supply of the oxidant at the required supply amount of the oxidant set at the previous control update timing is continued.

As described above, in the present embodiment, by referring to the first and second correspondence relationships stored in the storage unit 23, the required TRO concentration corresponding to the actually measured absorbance of the raw water is derived as the control target value. Therefore, an appropriate amount of oxidant to satisfy the IMO ballast water treatment standard corresponding to the water quality of the raw water can be supplied to the raw water, so that appropriate ballast water treatment can be performed. Further, the required TRO concentration derived by the calculation unit 24 is not the TRO concentration at the start of the supply of the oxidant, but the initial reaction TRO concentration after an elapse of a predetermined time from the start of the supply of the oxidant. Therefore, a more accurate amount of the oxidant to satisfy the IMO ballast water treatment standard can be calculated.

Second Embodiment

In the first embodiment, the TRO control target value is set by referring to the two kinds of correspondence relationships: the first correspondence relationship between the absorbance and the DOC concentration, and the second correspondence relationship between the DOC concentration and the required TRO concentration. However, the second embodiment is different from the first embodiment in that the target value of the TRO control is set with reference only to the direct correspondence relationship between the absorbance of the raw water and the required TRO concentration.

In the second embodiment, a direct correspondence relationship between the absorbance of the raw water and the required TRO concentration, which is obtained from the first correspondence relationship and the second correspondence relation described in the first embodiment, is derived as a relational expression, and the relational expression is stored in the storage unit 23 in advance. The relational expression is expressed by the following equations (2) or (3).

$$SV = a \times T_{AVE}^2 + b \times T_{AVE} + c \quad (2)$$

$$SV = d \times T_{AVE} + e \quad (3)$$

SV: Required TRO concentration (TRO control target value) (mg/L)
$T_{AVE}$: Average value of absorbance measured a plurality of times within a predetermined time
a, b, c, d, e: constant The constants a, b, c, d and e in equations (2) and (3) are determined in accordance with the measured absorbance, the DOC concentration, and the required TRO concentration of the raw water. For example, the inventors of the present application measured the absorbance, the DOC concentration, and the TRO concentration for a plurality of raw waters having different absorbances, and as a result, obtained the numerical values of: a=−12.5, b=28.5, c=2.5 in equation (2) and d=10.5 and e=1.16 in equation (3).

In this embodiment, the operation of controlling the supply amount of the oxidant by the oxidant supply amount control device 6 is the same as that in the first embodiment, except that the calculation unit 24 derives the required TRO concentration corresponding to the measurement value of the absorbance as the control target value by referring to the correspondence relationship stored in the storage unit 23, that is, the equation (2) or (3).

As described above, in the second embodiment, the target value of the control of the TRO concentration during the initial reaction is derived by referring only to the direct correspondence relationship between the absorbance of the raw water and the required TRO concentration. In comparison with the case of referring to the first and second correspondence relationships as in the first embodiment, the second embodiment can more easily derive the required TRO concentration.

In the first and second embodiments described above, the absorbance of the raw water is measured, and the supply amount of the oxidant is controlled to an appropriate amount corresponding to the water quality of the raw water. However, the absorbance of the raw water can be determined by measuring the light transmittance of the raw water. The light transmittance is the rate at which incident light transmits through a sample, and there is a relationship of absorbance=−log$_{10}$(light transmittance). Instead of measuring the absorbance of the raw water with an absorbance meter, the light transmittance of the raw water may be measured by a light transmittance meter to calculate the absorbance, so that the supply amount of the oxidant can be controlled in the same manner as in the first and second embodiments. Also, when calculating the absorbance by measuring the light transmittance, the absorbance may be corrected in accordance with the value specific to the light transmittance meter as represented by the relational expression: absorbance=−log$_{10}$(light transmittance measurement value+100−light transmittance of clear water) (light transmittance of clear water: value specific to light transmittance meter).

What is claimed is:

1. A ballast water treatment device comprising an oxidant supply device that supplies an oxidant to raw water to be taken in as ballast water into a ballast tank of a vessel to kill living organisms in the raw water, and an oxidant supply amount control device that controls a supply amount of the oxidant supplied by the oxidant supply device to the raw water to be taken in, wherein:

the oxidant supply amount control device includes an absorbance meter that measures absorbance of the raw water to be taken in, a storage unit, a calculation unit, and a control unit;

the storage unit is configured to store a correspondence relationship between the absorbance of the raw water and a concentration of dissolved organic carbon of the raw water as a first correspondence relationship, and to store a correspondence relationship between the concentration of the dissolved organic carbon of the raw water and a required residual oxidant concentration as a second correspondence relationship;

the calculation unit is configured to derive the concentration of the dissolved organic carbon corresponding to the absorbance of the raw water measured by the absorbance meter by referring to the first correspondence relationship, then to derive the required residual oxidant concentration corresponding to the derived concentration of the dissolved organic carbon by referring to the second correspondence relationship, and to calculate a required supply amount of the oxidant using the derived required residual oxidant concentration as a control target value;

the control unit is configured to control the oxidant supply device to supply the oxidant of the required supply amount calculated by the calculation unit to the raw water to be taken in; and the second correspondence relationship is acquired by the following (1) to (6):

(1) the required residual oxidant concentration is concentration of a residual oxidant required to kill the living organisms in the raw water and to suppress the regrowth of the living organisms in the ballast water stored in the ballast tank;

(2) supplying plural concentrations of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;

(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in, the ballast tank;

(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;

(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and (6) a correspondence relationship between the dissolved organic carbon concentration of the raw water and the required residual oxidant concentration obtained by (5) is acquired as the second correspondence relationship.

2. A ballast water treatment device comprising an oxidant supply device that supplies an oxidant to raw water to be taken in as ballast water into a ballast tank of a vessel to kill living organisms in the raw water, and, an oxidant supply amount control device that controls a supply amount of the oxidant supplied by the oxidant supply device to the raw water to be taken in, wherein:

the oxidant supply amount control device includes an absorbance meter that measures absorbance of the raw water to be taken in, a storage unit, a calculation unit, and a control unit;

the storage unit is configured to store a direct correspondence relationship between the absorbance of the raw water and a required residual oxidant concentration, the direct correspondence relationship being derived from a first correspondence relationship, which is a correspondence relationship between the absorbance of the raw water and a dissolved organic carbon concentration of the raw water, and a second correspondence relationship, which is a correspondence relationship between the dissolved organic carbon concentration of the raw water and the required residual oxidant concentration;

the calculation unit is configured to derive the required residual oxidant concentration corresponding to the absorbance of the raw water measured by the absorbance meter by referring to the direct correspondence relationship and to calculate a required supply amount of the oxidant by using the derived required residual oxidant concentration as a control target value;

the control unit is configured to control the oxidant supply device so supply the oxidant of the required supply amount calculated by the calculation unit to the raw water to be taken in; and the second correspondence relationship is acquired by the following (1) to (6):

(1) the required residual oxidant concentration is a concentration of a residual oxidant required to kill the living organisms in the raw water and to suppress the regrowth of the living organisms in the ballast water stored in the ballast tank;

(2) supplying plural concentrations of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;
(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;
(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;
(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and
(6) a correspondence relationship between the dissolved organic carbon concentration of the raw water and the required residual oxidant concentration obtained by (5) is acquired as the second correspondence relationship.

3. A ballast water treatment device comprising an oxidant supply device that supplies an oxidant to raw water to be taken in as ballast water into a ballast tank of a vessel to kill living organisms in the raw water, and an oxidant supply amount control device that controls a supply amount of the oxidant supplied by the oxidant supply device to the raw water to be taken in, wherein:
the oxidant supply amount control device includes a light transmittance meter that measures light transmittance of the raw water to be taken in, a storage unit, a calculation unit, and a control unit;
the storage unit is configured to store a correspondence relationship between absorbance of the raw water and a concentration of dissolved organic carbon of the raw water as a first correspondence relationship, and to store a correspondence relationship between the concentration of the dissolved organic carbon of the raw water and a required residual oxidant concentration as a second correspondence relationship;
the calculation unit is configured to calculate the absorbance of the raw water from the light transmittance of the raw water measured by the light transmittance meter, to derive the concentration of the dissolved organic carbon corresponding to the absorbance of the raw water measured by the light transmittance meter by referring to the first correspondence relationship, then to derive the required residual oxidant concentration corresponding to the derived concentration of the dissolved organic carbon by referring to the second correspondence relationship, and to calculate a required supply amount of the oxidant using the derived required residual oxidant concentration as a control target value;
the control unit is configured to control the oxidant supply device so supply the oxidant of the required supply amount calculated by the calculation unit to the raw water to be taken in; and the second correspondence relationship is acquired by the following (1) to (6):
(1) the required residual oxidant concentration is a concentration of a residual oxidant required to kill the living organisms in the raw water and to suppress the regrowth of the living organisms in the ballast water stored in the ballast tank;
(2) supplying plural concentrations of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;
(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;
(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;
(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and
(6) a correspondence relationship between the dissolved organic carbon concentration of the raw water and the required residual oxidant concentration obtained by (5) is acquired as the second correspondence relationship.

4. A ballast water treatment device comprising an oxidant supply device that supplies an oxidant to raw water to be taken in as ballast water into a ballast tank of a vessel to kill living organisms in the raw water, and an oxidant supply amount control device that controls a supply amount of the oxidant supplied by the oxidant supply device to the raw water to be taken in, wherein:
the oxidant supply amount control device includes a light transmittance meter that measures light transmittance of the raw water to be taken in, a storage unit, a calculation unit, and a control unit;
the storage unit is configured to store a direct correspondence relationship between absorbance of the raw water and a required residual oxidant concentration, the direct correspondence relationship being derived from a first correspondence relationship, which is a correspondence relationship between the absorbance of the raw water and a dissolved organic carbon concentration of the raw water, and a second correspondence relationship, which is a correspondence relationship between the dissolved organic carbon concentration of the raw water and the required residual oxidant concentration;

the calculation unit is configured to calculate the absorbance of the raw water from the light transmittance of the raw water measured by the light transmittance meter, to derive the required residual oxidant concentration corresponding to the absorbance of the raw water with reference to the direct correspondence relationship and to calculate a required supply amount of the oxidant by using the derived required residual oxidant concentration as a control target value;

the control unit is configured to control the oxidant supply device to supply, the oxidant of the required supply amount calculated by the calculation unit to the raw water to be taken in; and the second correspondence relationship is acquired by the following (1) to (6):

(1) the required residual oxidant concentration is a concentration of a residual oxidant required to kill the living organisms in the raw water and to suppress the regrowth of the living organisms in the ballast water stored in the ballast tank;

(2) supplying plural concentration of the oxidant of a plurality of kinds of concentrations to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;

(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;

(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;

(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and (6) a correspondence relationship between the dissolved organic carbon concentration of the raw water and the required residual oxidant concentration obtained by (5) is acquired as the second correspondence relationship.

5. A ballast water treatment method comprising:

an oxidant supply step of supplying an oxidant to raw water to be taken in as ballast water into a ballast tank of a vessel to kill living organisms in the raw water, and an oxidant supply amount control step of adjusting a supply amount of the oxidant supplied to the raw water in the oxidant supplying step, wherein:

the oxidant supply amount control step includes an absorbance measurement step of measuring absorbance of the raw water to be taken in, a dissolved organic carbon concentration derivation step, a required residual oxidant concentration derivation step, a required oxidant supply amount calculation step, and a control step;

the dissolved organic carbon concentration derivation step derives a concentration of the dissolved organic carbon of the raw water corresponding to the absorbance of the raw water measured in the absorbance measurement step, by referring to a first correspondence relationship, which is a correspondence relationship between the absorbance of the raw water and the concentration of the dissolved organic carbon in the raw water and which has been acquired in advance;

the required residual oxidant concentration derivation step derives a required residual oxidant concentration corresponding to the concentration of the dissolved organic carbon derived in the dissolved organic carbon concentration derivation step, by referring to a second correspondence relationship, which is a correspondence relationship between the concentration of the dissolved organic carbon in the raw water and the required residual oxidant concentration and which has been acquired in advance;

the required oxidant supply amount calculation step calculates a required supply amount of the oxidant using the required residual oxidant concentration derived in the required residual oxidant concentration derivation step as a control target value; and the control step controls the oxidant supply step to supply the oxidant of the required supply amount calculated by the required oxidant supply amount calculation step to the raw water to be taken in; and the second correspondence relationship is acquired by the following (1) to (6):

(1) the required residual oxidant concentration is a concentration of a residual oxidant required to kill the living organisms in the raw water and to suppress the regrowth of the living organisms in the ballast water stored in the ballast tank;

(2) supplying plural concentrations of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;

(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;

(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;

(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and
(6) a correspondence relationship between the dissolved organic carbon concentration of the raw water and the required residual oxidant concentration obtained by (5) is acquired as the second correspondence relationship.

6. A ballast water treatment method comprising:
an oxidant supply step of supplying an oxidant to raw water to be taken in as ballast water into a ballast tank of a vessel to kill living organisms in the raw water, and an oxidant supply amount control step of adjusting a supply amount of the oxidant supplied to the raw water in the oxidant supplying step, wherein:
the oxidant supply amount control step includes an absorbance measurement step of measuring absorbance of the raw water to be taken in, a required residual oxidant concentration derivation step, a required oxidant supply amount calculation step, and a control step;
the required residual oxidant concentration derivation step derives a required residual oxidant concentration corresponding to the absorbance of the raw water measured by the absorbance measurement step, by referring to a direct correspondence relationship between the absorbance of the raw water and the required residual oxidant concentration and which has been acquired in advance from a first correspondence relationship, which is a correspondence relationship between the absorbance of the raw water and a dissolved organic carbon concentration of the raw water, and a second correspondence relationship, which is a correspondence relationship between the dissolved organic carbon concentration of the raw water and the required residual oxidant concentration;
the required oxidant supply amount calculation step calculates a required supply amount of the oxidant using the required residual oxidant concentration derived in the required residual oxidant concentration derivation step as a control target value;
the control step controls the oxidant supply step to supply the oxidant of the required supply amount calculated by the required oxidant supply amount calculation step to the raw water to be taken in; and
the second correspondence relationship is acquired by the following (1) to (6):
(1) the required residual oxidant concentration is a concentration of a residual oxidant required to kill the living organisms in the raw water and to suppress the regrowth of the living organisms in the ballast water stored in the ballast tank;
(2) supplying plural concentrations of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;
(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;
(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;
(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and
(6) a correspondence relationship between the dissolved organic carbon concentration of the raw water and the required residual oxidant concentration obtained by (5) is acquired as the second correspondence relationship.

7. A ballast water treatment method comprising:
an oxidant supply step of supplying an oxidant to raw water to be taken in as ballast water into a ballast tank of a vessel to kill living organism's in the raw water, and an oxidant supply amount control step of adjusting a supply amount of the oxidant supplied to the raw water in the oxidant supplying step, wherein:
the oxidant supply amount control step includes a light transmittance measurement step of measuring light transmittance of the raw water to be taken in, a dissolved organic carbon concentration derivation step, a required residual oxidant concentration derivation step, a required oxidant supply amount calculation step, and a control step;
the dissolved organic carbon concentration derivation step calculates absorbance of the raw water from the light transmittance of the raw water measured in the light transmittance measuring step and derives a concentration of the dissolved organic carbon corresponding to the absorbance of the raw water measured in the light transmittance measurement step, by referring to a first correspondence relationship, which is a correspondence relationship between the absorbance of the raw water and the concentration of the dissolved organic carbon in the raw water and which has been acquired in advance;
the required residual oxidant concentration derivation step derives a required residual oxidant concentration corresponding to the concentration of the dissolved organic carbon of the raw water derived in the dissolved organic carbon concentration derivation step, by referring to a second correspondence relationship, which is a correspondence relationship between the concentration of the dissolved organic carbon in the raw water and the required residual oxidant concentration and which has been acquired in advance;
the required oxidant supply amount calculation step calculates a required supply amount of the oxidant by using the required residual oxidant concentration derived by the required residual oxidant concentration derivation step as a control target value;
the control step controls the oxidant supply step to supply the oxidant of the required supply amount calculated by the required oxidant supply amount calculation step to the raw water taken in by the oxidant supply step; and the second correspondence relationship is acquired by the following (1) to (6):

(1) the required residual oxidant concentration is a concentration of a residual oxidant required to kill the living organisms in the raw water and to suppress the regrowth of the living organisms in the ballast water stored in the ballast tank;

(2) supplying plural concentration of the oxidant to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;

(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;

(4) the residual oxidant concentration at a time point after a predetermined period of time has elapsed since the supply of the oxidant at the concentration of the oxidant obtained by (3) to the raw water of a dissolved organic carbon concentration and during an initial reaction, which is a reaction between the oxidant and a dissolved organic matter, is derived as the required residual oxidant concentration corresponding to the raw water of the dissolved organic carbon concentration;

(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and (6) a correspondence relationship between the dissolved organic carbon concentration of the raw water and the required residual oxidant concentration obtained by (5) is acquired as the second correspondence relationship.

8. A ballast water treatment method comprising:

an oxidant supply step of supplying an oxidant to raw water to be taken in as ballast water into a ballast tank of a vessel to kill living organisms in the raw water, and an oxidant supply amount control step of adjusting a supply amount of the oxidant supplied to the raw water in the oxidant supplying step, wherein:

the oxidant supply amount control step includes a light transmittance measurement step of measuring light transmittance of the raw water to be taken in, a required residual oxidant concentration derivation step, a required oxidant supply amount calculation step, and a control step;

the required residual oxidant concentration derivation step calculates absorbance of the raw water from the light transmittance of the raw water measured by the light transmittance measurement step, and derives a required residual oxidant concentration corresponding to the absorbance of the raw water, by referring to a direct correspondence relationship between the absorbance of the raw water and the required residual oxidant concentration, the direct correspondence relationship being derived from a first correspondence relationship, which is a correspondence relationship between the absorbance of the raw water and a dissolved organic carbon concentration of the raw water, and a second correspondence relationship, which is a correspondence relationship between the dissolved organic carbon concentration of the raw water and a required residual oxidant concentration;

the required oxidant supply amount calculation step calculates a required supply amount of the oxidant by using the required residual oxidant concentration derived by the required residual oxidant concentration derivation step as a control target value;

the control step controls the oxidant supply step to supply the oxidant of the required supply amount calculated by the required oxidant supply amount calculation step to the raw water to be taken in; and the second correspondence relationship is acquired by the following (1) to (6):

(1) the required residual oxidant concentration is a concentration of a residual oxidant required to kill the living organisms in the raw water and to suppress the regrowth of the living organisms in the ballast water stored in the ballast tank;

(2) supplying plural concentrations of the oxidant of a plurality of kinds of concentrations to the raw water of a dissolved organic carbon concentration, and calculating, for each concentration of the oxidant, a time integration value of the residual oxidant concentration during a period from supply of the oxidant up to a predetermined time point in an intermediate reaction, which is a reaction between the oxidant and a non-dissolved organic matter and a reaction by self-decomposition of the oxidant;

(3) from a result of calculation of the time integration value of the residual oxidant concentration of (2), a concentration of the oxidant is obtained, which makes the time integration value of the residual oxidant concentration fall within a predetermined range of the time integration value of the residual oxidant concentration to kill the living organisms in the raw water and to suppress the regrowth of the living organisms in the ballast water stored in the ballast tank;

(4) the residual oxidant concentration at a time point after a predetermined period of time has elapsed since the supply of the oxidant at the concentration of the oxidant obtained by (3) to the raw water of the dissolved organic carbon concentration and during an initial reaction, which is a reaction between the oxidant and a dissolved organic matter, is derived as the required residual oxidant concentration corresponding to the raw water of the dissolved organic carbon concentration;

(5) a correspondence relationship between the dissolved organic carbon concentration and the required residual oxidant concentration for the raw water of a plurality of concentrations of the dissolved organic carbon is derived through (2) to (4) for the raw water of each concentration of the dissolved organic carbon; and (6) a correspondence relationship between the dissolved organic carbon concentration of the raw water and the required residual oxidant concentration obtained by (5) is acquired as the second correspondence relationship.

* * * * *